United States Patent [19]

Hoppmann et al.

[11] 3,831,734

[45] Aug. 27, 1974

[54] CENTRIFUGAL METHOD OF SORTING PARTICULATE ARTICLES

[75] Inventors: Kurt H. Hoppmann, Falls Church, Va.; George W. Edmunds, Derwood, Md.; Horst A. Schober, Falls Church, Va.

[73] Assignee: Hoppman Corporation, Springfield, Va.

[22] Filed: Mar. 26, 1973

[21] Appl. No.: 344,696

[52] U.S. Cl............................ 198/33 AA, 221/171
[51] Int. Cl............................................ B65g 47/24
[58] Field of Search...... 198/33 AA, 33 R; 221/171, 221/173

[56] References Cited
UNITED STATES PATENTS

| | | | |
|---|---|---|---|
| 2,767,881 | 10/1956 | Gruenberg | 221/173 X |
| 2,904,162 | 9/1959 | Simer | 198/33 AA |
| 3,635,325 | 1/1972 | Sterling | 198/33 AA |

Primary Examiner—Richard A. Schacher
Assistant Examiner—Douglas D. Watts

[57] ABSTRACT

High speed feeding, counting, orienting and storing of small parts such as candy, machine screws and nuts, ammunition, pills and the like. The articles are accelerated and centrifugally distributed in single file alignment upon a rotating inner plane, then discharged upon an inclined stationary ramp which delivers the articles in single file alignment to a rotating outer plane. The articles are spaced longitudinally by guiding or restraining the articles during their radial discharge from the rotating outer plane. The articles may be stored in reservoirs at the periphery of the outer plane. Modifications of invention include variously configuring rotating planes and guiding wall, pivoting the articles during their discharge so as to advance their center of gravity radially outwardly and vertically orienting the articles by gravity drop feeding in a reservoir at the periphery of the outer rim.

9 Claims, 16 Drawing Figures

CENTRIFUGAL METHOD OF SORTING PARTICULATE ARTICLES

CROSS REFERENCES TO RELATED APPLICATIONS

An improvement upon applicant's earlier filed application entitled METHOD OF ORIENTING ARTICLES (Ser. No. 264,636), filed June 20, 1972. The present application is distinguished by its use of a wide rotating outer plane or rim which allows additional functions such as separation, orientation, and storage of parts to be performed more reliably and accurately.

BACKGROUND OF THE INVENTION

1. Field of the Invention

Increasing attention is being given to methods for high speed orientation of nails, pills, machine screws, nuts, small arms munitions and the like. Recent inventors have evolved a plurality of rotating devices which centrifugally discharge articles to be counted from the edges of a rotating plane. Traditionally these centrifugally distributed articles are forced through a separate stationary exit aperture and then counted in a separate orienting and counting mechanism.

The separate vertical orienting and counting is time consuming, subject to jamming and breakdown and economically discouraging due to greater capital cost and space required for operation.

2. Description of the Prior Art

| | |
|---|---|
| HOAR | 2,632,588 |
| GARRETT | 2,763,108 |
| d'AUTHEVILLE | 3,063,596 |
| PEARSON | 3,170,627 |
| HURST | 3,215,310 |
| READ | 3,253,604 |
| PEARSON | 3,266,664 |
| HURST | 3,368,713 |

SUMMARY OF THE INVENTION

According to the present invention, particulate articles are sorted by centrifugally distributing the articles while accelerating them upon a rotating inner plane, discharging the accelerating articles in alignment upon an inclined stationary ramp at the periphery of the rotating inner plane, centrifugally carrying the articles in single file alignment away from the top of said ramp and upon a rotating outer rim; and guiding the articles across the rim so as to separate longitudinally orient and then store said articles prior to their peripheral discharge from said rim.

DESCRIPTION OF THE PREFERRED EMBODIMENTS

Applicants' method suggests a device to accomplish the high speed feeding, counting and orienting of small parts such as candy, machine screws and nuts and miscellaneous small parts. Conventionally, in order for parts to be counted or oriented they are first arranged in a single file stream. One means of accomplishing this is through the use of a centrifugal feeder, a device consisting of an inner rotating bowl or disc and an outer rotating rim. The parts are caused to pass from the inner disc to the outer rim where they assume a single file stream. The parts are then allowed to leave the rim at a predetermined exit point, they are then acted upon by additional mechanism to orient the parts for further processing or to separate the parts for counting.

Since parts processed in high speed feeding have an average output of 1,200 to 1,800 pieces per minute, the changeover of these parts from one transport to another is a potential source of trouble. If, in addition to being transferred from one transport to another, the parts are also required to change direction, the changeover problem is compounded.

If the parts are to be separated for counting, they generally are overaccelerated in order to insure positive spacing in the most unfavorable conditions. Furthermore the device which causes the acceleration can potentially cause damage to delicate parts as well as being a source of jamming. Since the parts are moving at a high speed as they leave the rim, the problems concerned with absorbing their kinetic energy in order to stop them are compounded as the speed is increased.

Another advantage in orienting on the rim is that the parts travel much slower during the orientation process. If there are, say, thirty channels or grooves on the rim and the orientation occurs during approximately 360° rotation, then there are effectively thirty parallel channels and the speed of the parts during orienting is reduced by thirty. For instance, if the total output of the machine is 1,200 parts per minute, then the parts are oriented at a rate of only 40 parts per minute. It is easy to appreciate the tremendous advantage in reliability that is gained by operating at the slower speed.

The wide rim centrifugal feeder suggested according to the present invention provides a device that permits a single transport to accomplish what previously required two or more transports. That is, parts can now be oriented and/or spaced for counting on the same rim which arranges these parts in a single file stream. This eliminates the problems of changeover from one transport to another. Spacing between parts can be accomplished at a precisely controlled speed and without additional mechanism acting upon the parts.

Figure 1:
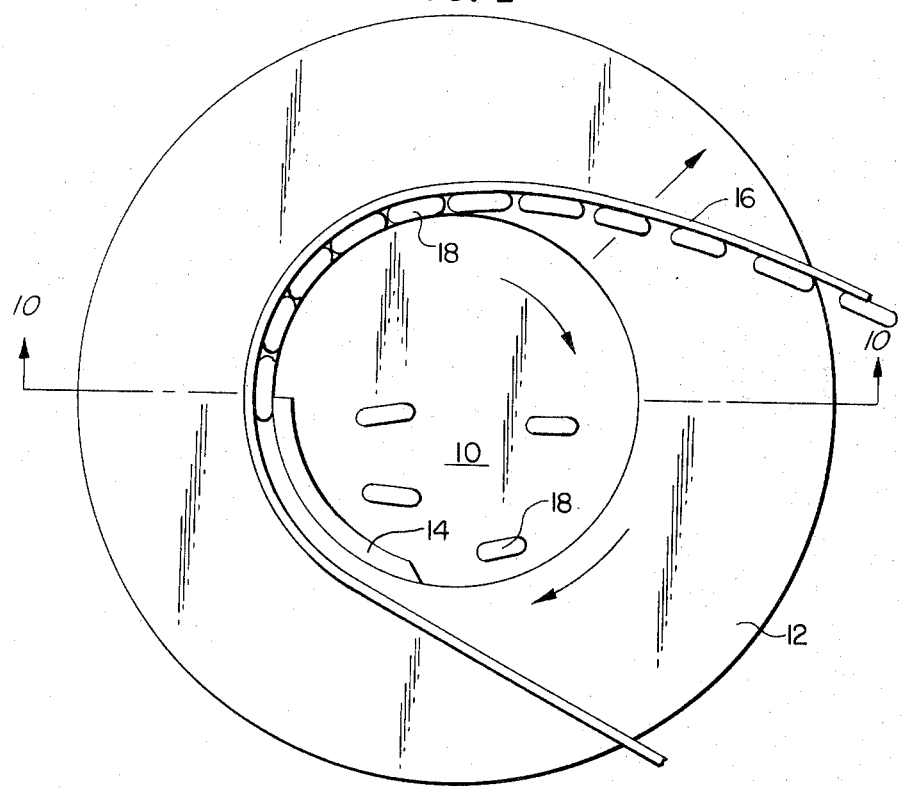
FIG. 1 is a top plan view of a proposed apparatus showing rotating inner and outer rims with tangential guide wall.
Figure 10:
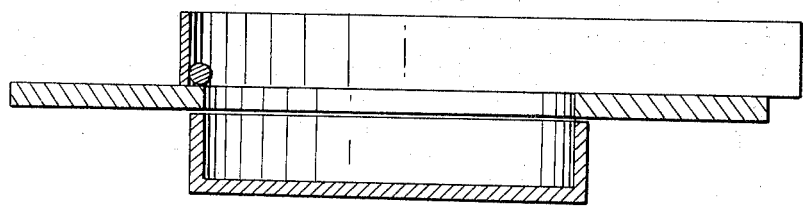
FIG. 10 is a fragmentary vertical section of the rotating rims and guide walls illustrated in FIG. 1.

FIG. 1 shows the wide rim centrifugal feeder concept. The device consists of a rotating inner disc or bowl 10, a rotating wide rim 12, a ramp means 14 of elevating the parts from the inner disc to the wide rim, and a guide wall 16 placed above the rotating 12 rim. The parts 18 being sorted are first placed upon the inner disc 10, carried by centrifugal force up stationary ramp 14 to the rotating rim 12 and there arranged single file. As the parts 18 are carried along with the rim 12, the guide wall 16 allows them to travel radially from the inside to the outside of the rim 12. As the parts make this radial traverse, there is space and time to impart additional separating movements, caused by centrifugal force which is a very gentle motivating force.

Positive separation between parts is easily accomplished by locking the parts at a radial position on the rim 12. Then, as they traverse from the inside to the outside, there will automatically be a space between parts.

There are two ways of locking the parts 18 at a radial position on rim 12. They both provide a high driving surface on the rim and a relatively low restraining surface on the guide wall 16. The first method provides the rim 12 with a high friction surface, such as rubber for example, and the guide wall 16 with a low friction surface, such as polished stainless steel.

Figure 2:
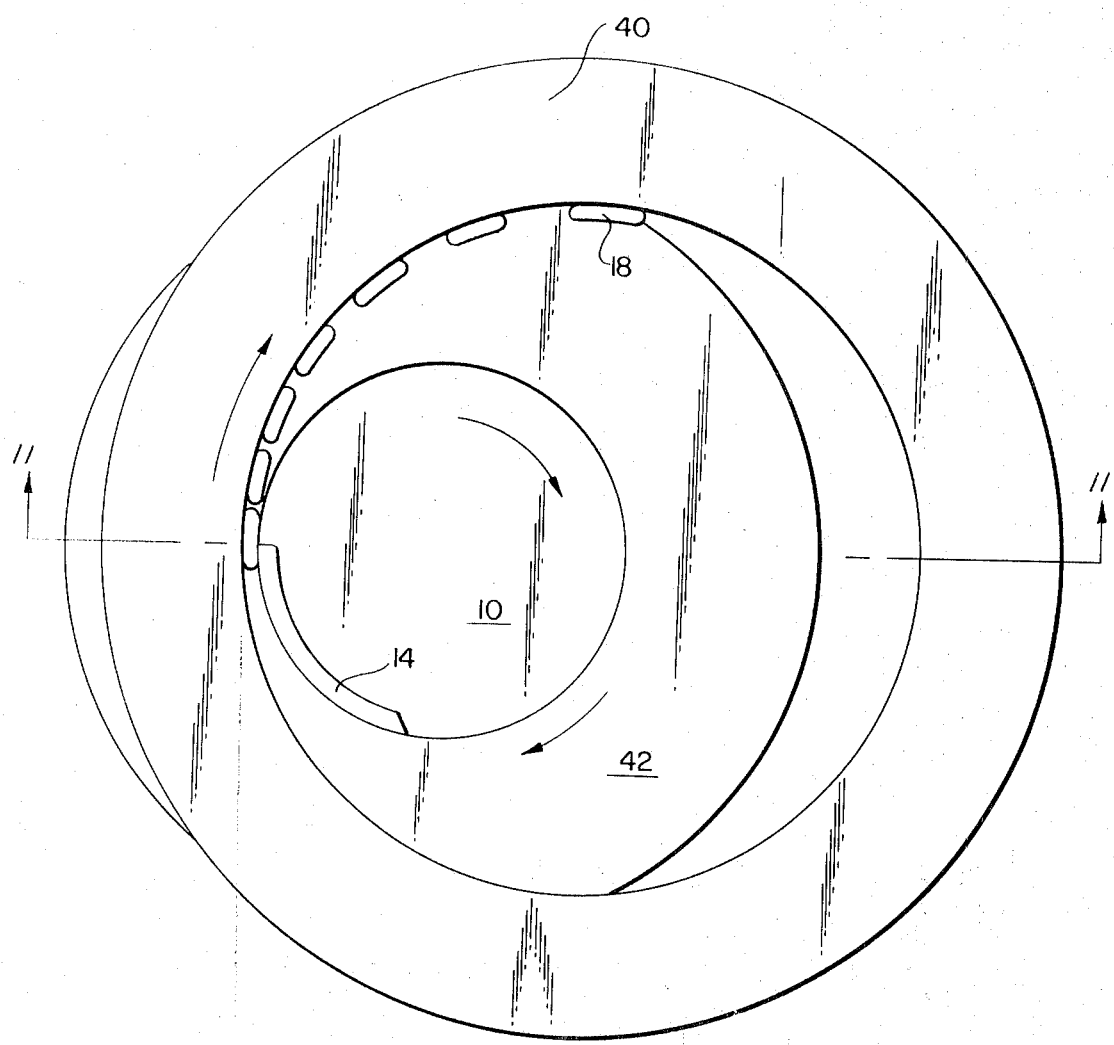
FIG. 2 is a top plan of a modified form of the method wherein the outer wall is rotated.
Figure 11:
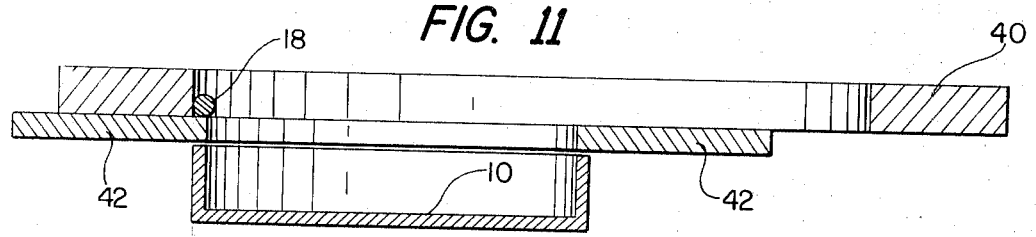
FIG. 11 is a fragmentary vertical section of the rotating inner disc, wide rim and guide wall illustrated in FIG. 2.

As illustrated in FIGS. 2 and 11, the restraining force of the rotating rim 12 can be even further reduced by making the guide wall 16 a moving member 40 and providing overlapping and modified wide rotating rim 42.

Figure 3:
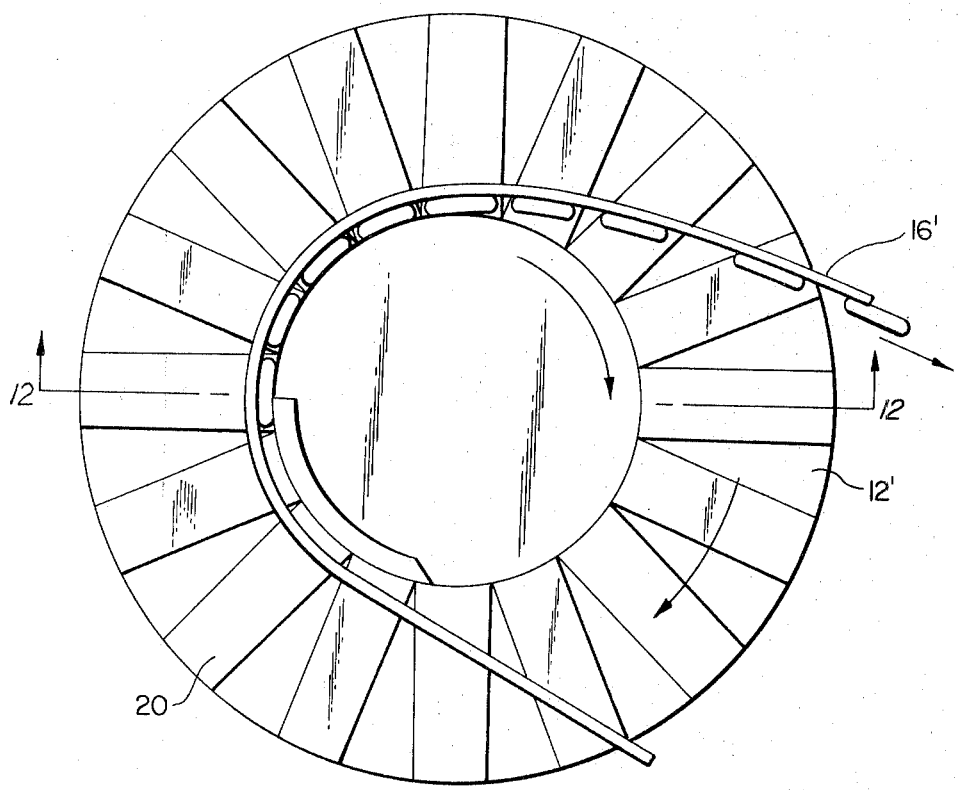
FIG. 3 is a top plan of a further modification wherein the rotating outer rim is provided with increased drive by the use of radial channels.
Figure 12:
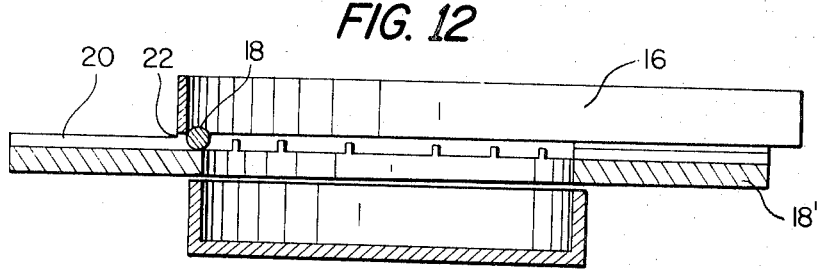
FIG. 12 is a fragmentary vertical section of the modification illustrated in FIG. 3 and embodying a rotating wide rim with radial channels.

As illustrated in FIGS. 3 and 12, the high driving surface of the rim 12 can also be accomplished by providing radial grooves 20 on the rim surface. These grooves 20 would be wide enough to accept only one part 18 and high enough as at 22 to prevent the parts from leaving the groove but would still expose the parts to restraint by the guide wall, as illustrated in FIG. 12.

Figure 4:
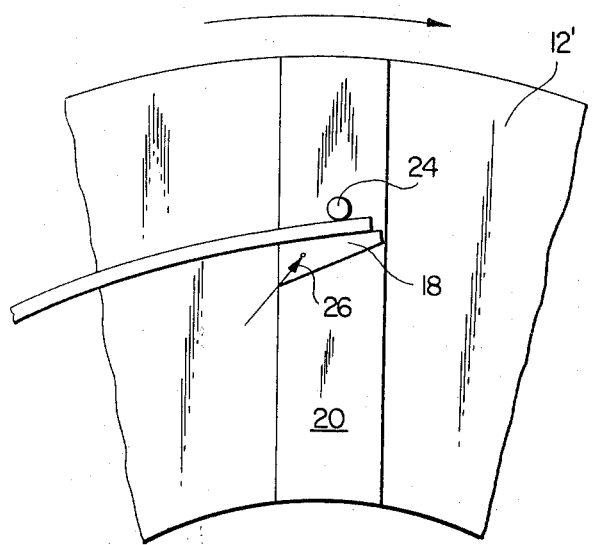
FIG. 4 is a fragmentary top plan showing the use of a pin in the radial channels so as to rotate the article being sorted with its center of gravity end first.
Figure 5:
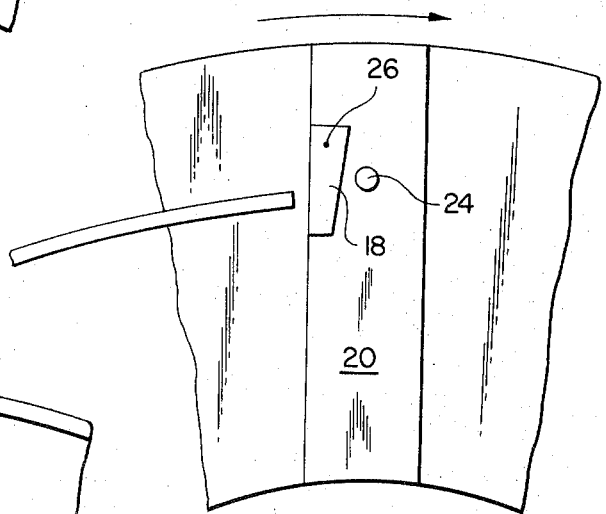
FIG. 5 is a further view of the technique illustrated in FIG. 4, showing the article rotated 90° and in radial attitude.

Parts 18 can be oriented as they travel the width of the rim. Consider for example a cylindrical piece with its center of gravity at one end of the piece. Let the part be placed in a groove 20 as in FIGS. 4 and 5. Now, as the part 18 traverses to the outside of the rim, let it encounter a vertical pin 24 in the middle of the groove 20. Centrifugal force acting on the center of gravity of the part 18 will cause the heavier end 26 to swing outwards, causing the piece 18 to assume a position 90° from its original position, as illustrated in FIG. 5. The pieces could then be delievered from the rim 12 in a horizontal side by side position with the heavier ends all facing the same way.

Figure 6:
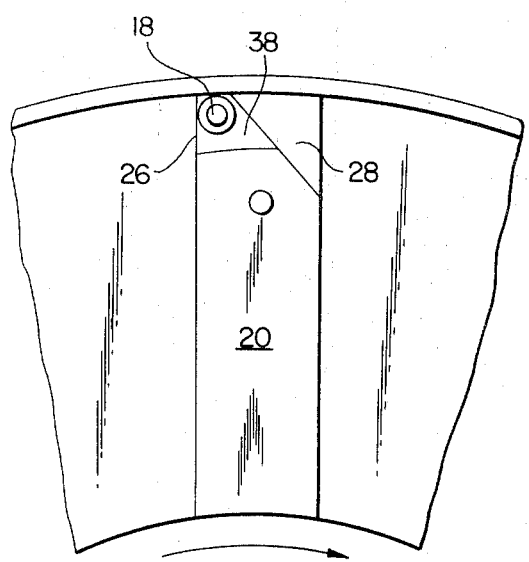
FIG. 6 is fragmentary top plan view showing a further modification wherein the articles being sorted are oriented vertically by dropping center of gravity first into a well at the edge of the rim.
Figure 7:
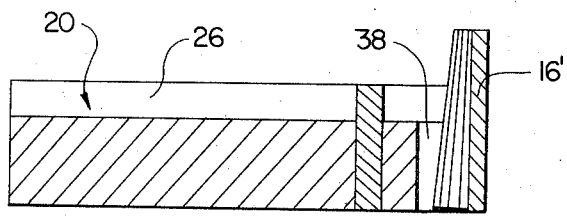
FIG. 7 is a further view of the modification shown in FIG. 6, showing the article vertically oriented against the driving wall.

If the parts 18 are to be delivered in a vertical position, they can be rotated vertically into well 38 under the force of gravity while still on the rim and then discharged, as illustrated in FIGS. 6 and 7. To insure that the parts do not tumble in making the transition from a horizontal to a vertical position, the parts should ideally be pressed against the driving wall 26 during the transition. Depending upon which way the parts turn around the vertical orienting pin 24, they may or may not be in this optimum position during vertical orientation. A wedge shaped guiding surface 28 on the leading side of the groove 20 as shown in FIG. 6 will properly guide the parts to the driving wall 26.

Figure 8:
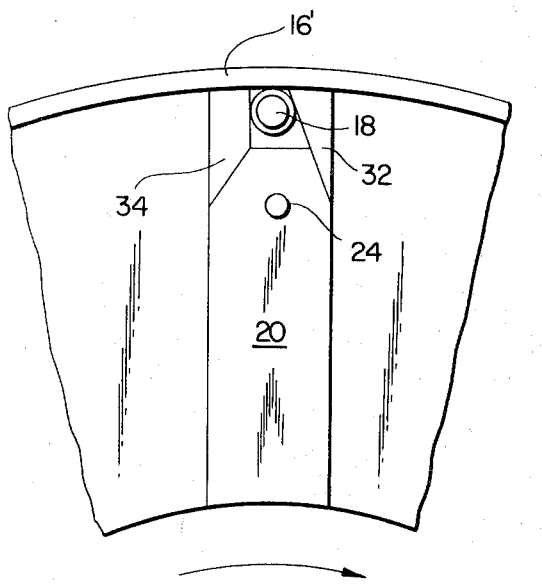
FIG. 8 is a fragmentary top plan showing a further modification of the vertical orienting wherein fore and aft guiding shoulders are used.
Figure 9:
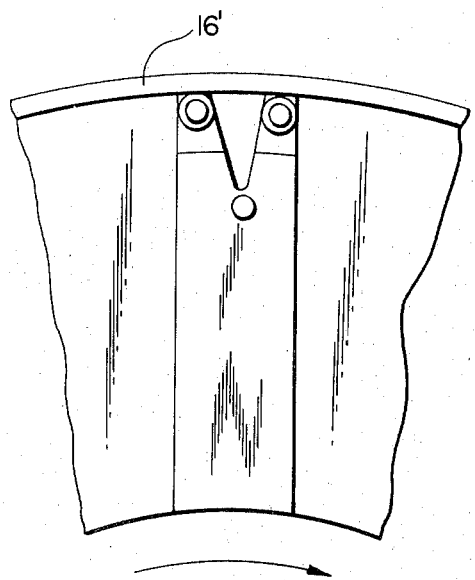
FIG. 9 is a fragmentary top plan showing a further modification wherein a truncated shoulder may be employed to distribute the articles either forwardly or rearwardly of the pivot.

Several variations of the guiding surface are possible. In FIG. 8, the parts become oriented vertically at the center of groove 20 by means of shoulders 32 and 34, rather than to one side as in FIG. 6.

One of the problems encountered in orienting parts for in-line processing is the assembling of the parts into a definite spacing whether it be at predetermined intervals or in a touching side by side condition. The present high speed centrifugal feeders will deliver parts single file, in line, but at a random spacing. Therefore, after being delivered from the rim, the parts must first be collected into a touching side by side condition (such as in a reservoir) and then removed from the reservoir at prescribed intervals. This reservoir can be built into the modified wide rim 48 by making the grooves 50 longer in the radial dimension. Each groove 50 then becomes a reservoir and oriented parts can be delivered from each and every groove at a definite spacing.

Figure 13:
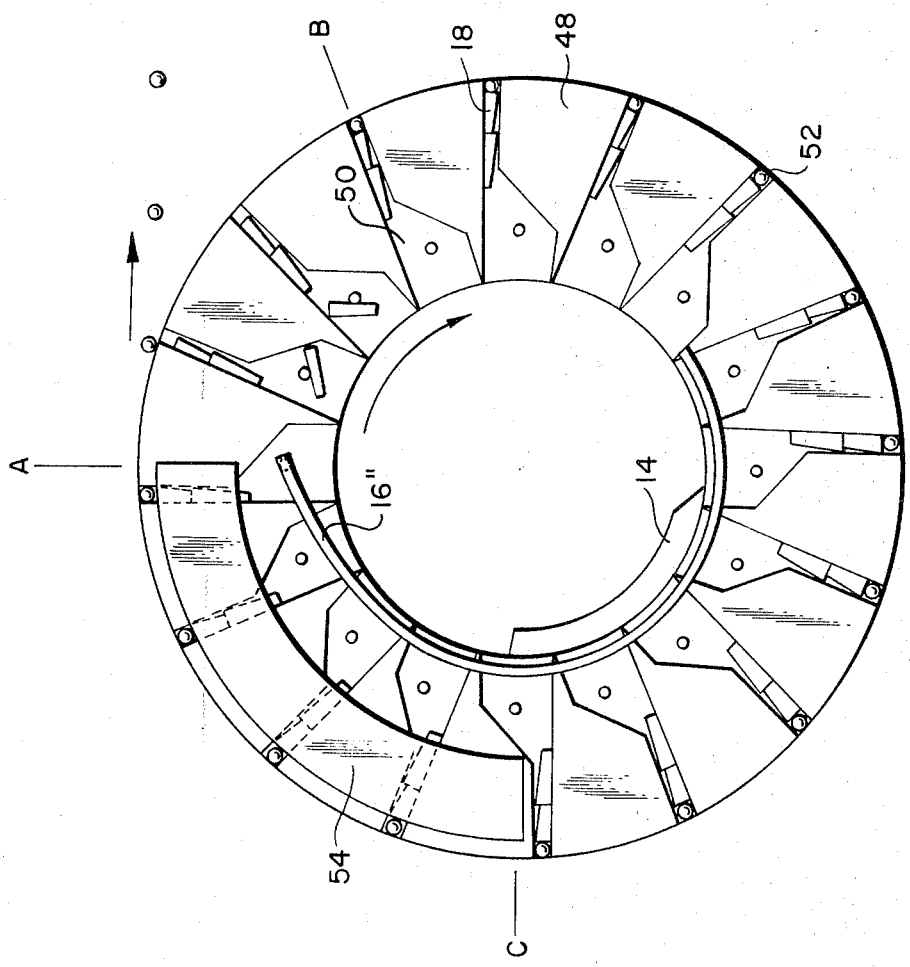
FIG. 13 is a top plan of a modified rim provided with a storage reservoir at the outer end of each groove.

Several means of using the grooves as reservoirs are shown. FIG. 13 shows a plan view of the grooved rim 48. In this device, cylindrical shaped objects 18 which have a heavier end are fed up the stationary ramp 14 against wall 16 and into grooves 50 on the wide rim as previously described. As the rim 48 rotates from A to B, the parts are pivoted around the pin 24 as previously described. From B to C the parts are either held in the oriented horizontal position in the rim or they are pivoted to a vertical position if there is not a vertical part already in the pocket 52. From C to A the vertically oriented parts are dropped out of the rim into pockets in a chain (not illustrated) moving at the same speed as the rim 48. During this arc of rotation, the horizontally oriented parts are prevented from assuming a vertical orientation by a stationary horizontal plate 54.

Figure 16:
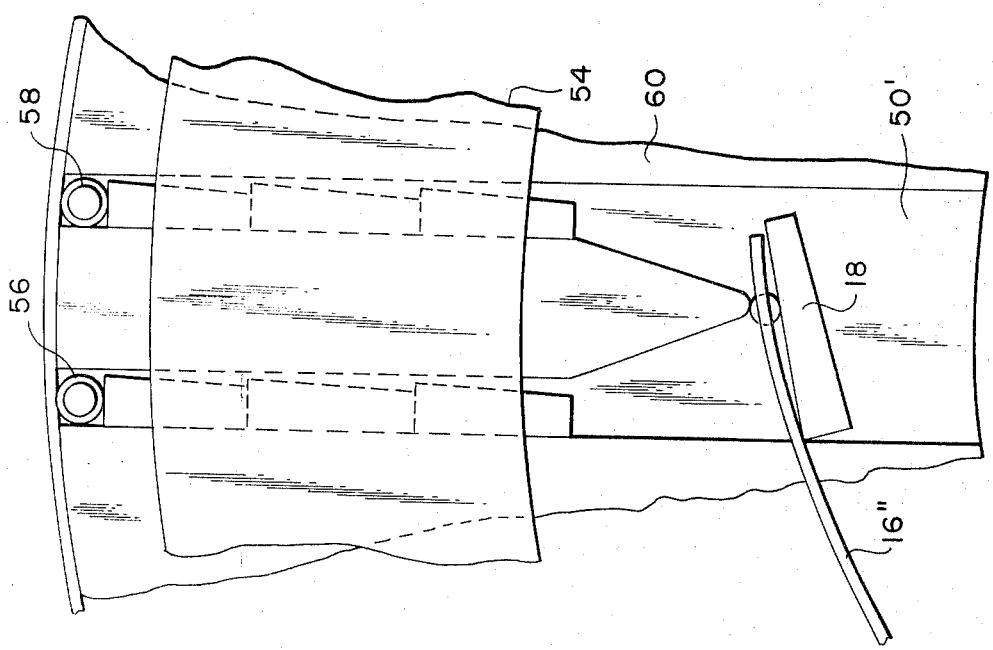
FIG. 16 is a fragmentary top plan of a modified rotating outer rim, embodying dual reservoirs 56 and 58 for each radial groove 50 prime.
Figure 14:
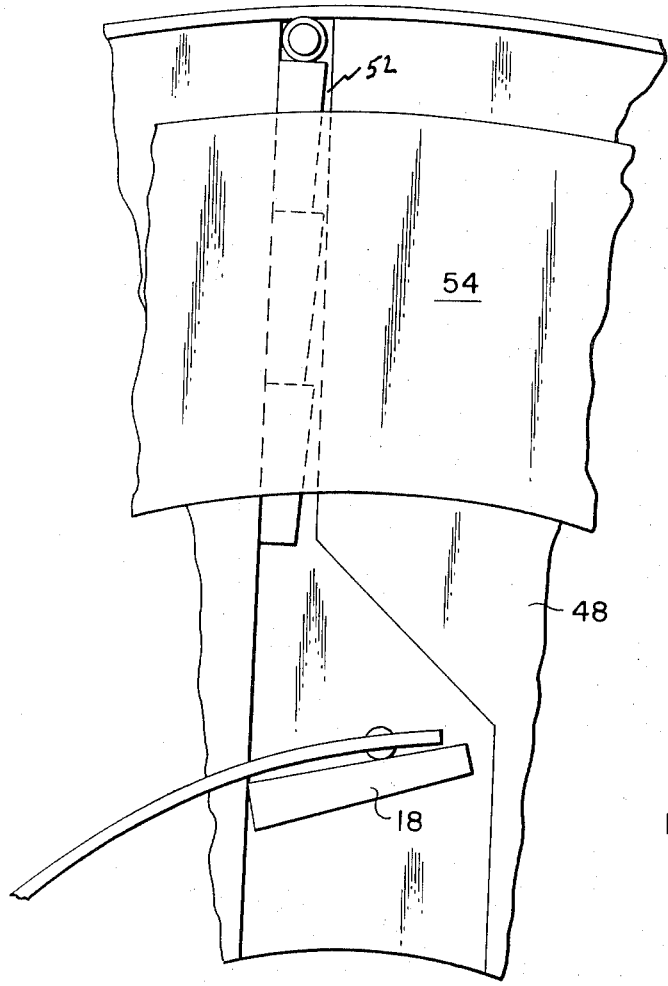
FIG. 14 is an enlarged fragmentary plan thereof showing the article 18 being pivoted about a pin prior to storing in the radial groove.
Figure 15:
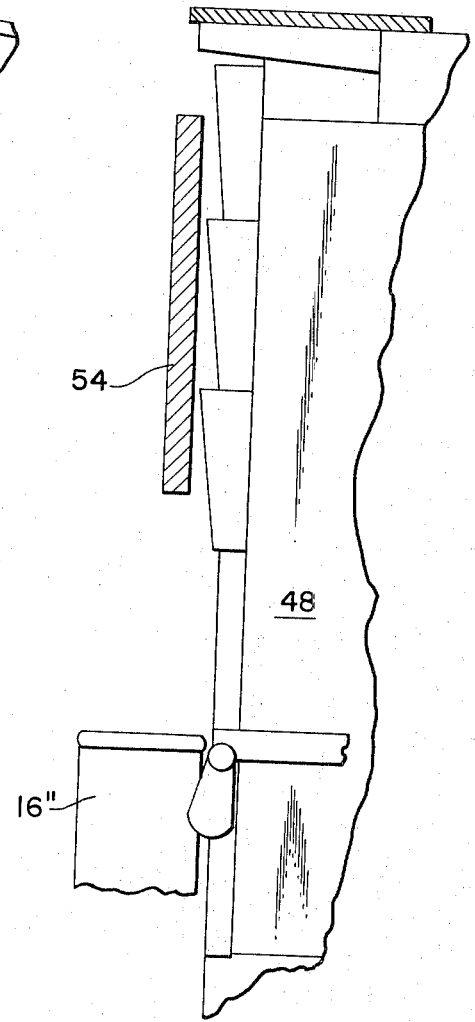
FIG. 15 is a fragmentary vertical elevation thereof.

When the machine is first started, the reservoirs may be manually filled, or cut off devices may be used to prevent the parts from dropping out during the first several revolutions until a reservoir of parts is provided in each groove 50. FIG. 14 shows a single reservoir channel 52 per groove and FIG. 16 shows double reservoir channels 56 and 58 per groove in rim 60.

In addition to using the grooves as reservoirs for in-line feeding of oriented parts, the reservoir principle may be used for counting parts. By providing a storage of parts in each groove, it is possible to deliver a known quantity of parts per revolution. The parts are released by cut off devices (not illustrated) at each groove. If the cut off devices rotate with the rim and discharge the parts over a segment of rotation, the gating is effectively done at a much slower rate than the overall feed rate of the machine. This leads to more accurate counting and more gentle handling of the parts.

The wide rim, of course, does not necessarily have to be flat. It can have a configuration which is contoured radially to assist in the orientation of the parts. For instance, a truncated conical shaped rim sloping downwards and outwards would make use of gravity as well as centrifugal force to orient the parts. Also, of course, various means other than the rotating inner rim 10 and stationery ramp 14 may be employed, respectively, for accelerating and delivering the particles to the wide rotating rim or plane.

We claim:

1. Centrifugal method of sorting particulate articles comprising:
   A. centrifugally distributing and aligning while accelerating said articles upon a rotating inner rim;
   B. discharging said accelerating articles in alignment upon an inclined stationary ramp at the periphery of said rotating inner rim;
   C. centrifugally carrying said articles in single file alignment away from the top of said ramp upon a rotating outer rim; and
   D. guiding said articles across said rim, so as to separate longitudinally said articles prior to their peripheral discharge from said rim.

2. Centrifugal method of sorting particulate articles as in claim 1, wherein said guiding is by stationary restraining in a vertical plane above said rim.

3. Centrifugal method of sorting particulate articles as in claim 1, including substantially tangentially guiding said articles away from said rotating rim.

4. Centrifugal method of sorting particulate articles as in claim 1, wherein said guiding is by means of a moving baffle.

5. Centrifugal method of sorting particulate articles as in claim 1, wherein said guiding is by means of a vertical baffle having a low coefficient of friction.

6. Centrifugal method of sorting particulate articles as in claim 1, wherein said centrifugal carrying of said articles is upon a rim surface having a high coefficient of friction.

7. Centrifugal method of sorting particulate articles as in claim 1, including:
   E. pivoting said articles upon said rotating outer rim, such that the heavier end of said article is discharged radially towards the outer periphery of said rim.

8. Centrifugal method of sorting particulate articles as in claim 1, including:
   F. vertically orienting said articles at the outer periphery of said rotating rim by rotating said rim at a speed such that the force of gravity overcomes centrifugal forces at the outer periphery of said rotating rim.

9. Centrifugal method of sorting particulate articles as in claim 1, including:
   G. storing by retaining said articles at the periphery.

* * * * *